United States Patent
Wu et al.

(10) Patent No.: US 10,215,834 B2
(45) Date of Patent: Feb. 26, 2019

(54) DUAL AXIS SOLAR TRACKER

(71) Applicant: Tsinghua University, Beijing (CN)

(72) Inventors: Jun Wu, Beijing (CN); Liping Wang, Beijing (CN); Binbin Zhang, Beijing (CN); Ying Gao, Beijing (CN); Tianrui Xu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 176 days.

(21) Appl. No.: 15/370,551

(22) Filed: Dec. 6, 2016

(65) Prior Publication Data

US 2018/0017658 A1    Jan. 18, 2018

(30) Foreign Application Priority Data

Jul. 14, 2016  (CN) .......................... 2016 1 0557513

(51) Int. Cl.
| | |
|---|---|
| *H01J 40/14* | (2006.01) |
| *G01S 3/786* | (2006.01) |
| *H02S 20/32* | (2014.01) |
| *F24S 50/20* | (2018.01) |
| *F24S 30/452* | (2018.01) |
| *F24S 30/00* | (2018.01) |

(52) U.S. Cl.
CPC ........... *G01S 3/7861* (2013.01); *F24S 30/452* (2018.05); *F24S 50/20* (2018.05); *H02S 20/32* (2014.12); *F24S 2030/11* (2018.05); *F24S 2030/131* (2018.05); *F24S 2030/137* (2018.05)

(58) Field of Classification Search
CPC ...... G01S 3/7861; G01S 3/7862; H02S 20/32; G05D 3/105
USPC ......................................... 250/203.4; 136/246
See application file for complete search history.

(56) References Cited

U.S. PATENT DOCUMENTS

2009/0014054 A1 *  1/2009  Cano Messeguer .... H02S 20/00
                                                         136/246

FOREIGN PATENT DOCUMENTS

WO    WO-2009087252 A1 *  7/2009  ............ F24S 30/452

* cited by examiner

*Primary Examiner* — Kevin K Pyo
(74) *Attorney, Agent, or Firm* — Hodgson Russ LLP

(57) ABSTRACT

A dual axis solar tracker is provided. The dual axis solar tracker includes a moving platform, a fixed platform, a serial chain, a parallel chain and a driving device. The moving platform is supported by the serial chain and driven by the parallel chain, forming a parallel tracking mechanism. The driving device is configured to drive the parallel chain to motion so as to drive the moving platform to rotate around vertical and horizontal axes. The dual axis solar tracker of the present disclosure has a larger workspace, a better tracking performance and advantages of high rigidity, low energy consumption, small driving torque and low inertia, etc.

8 Claims, 4 Drawing Sheets

DUAL AXIS SOLAR TRACKER

FIELD

The present disclosure relates to a technical field of new energy resources, and more particularly to a dual axis solar tracker.

BACKGROUND

Solar energy systems have emerged as a viable source of renewable energy over the past two or three decades, and are now widely used in a variety of industrial and domestic applications. Such systems are designed to collect the solar energy and to convert it into either electrical power or thermal energy. The optimum solar energy is obtained when sun rays are incident vertically to the transforming part of solar power systems. Examples include solar thermal system and photovoltaic system. Both concentrated solar collector and photovoltaic collector require the use of solar trackers to increase the area exposed to the direct radiation of the sun.

The solar trackers can be divided into single-axis trackers and dual-axis trackers by taking into account the mechanical characteristics. Since dual-axis systems are able to obtain an optimal tracking of the sun, they are more popular in all the types of concentrated solar technologies, with the exception of the trough-style system. However, the predominant dual-axis trackers are commonly designed based on serial architectures where two revolute joints ensure the rotational DOFs. The trackers require a very stout pole drilled into the ground to support normal loading. In all cases, the pole height is at least half of the panel height above the ground so that the tracker can orient toward the sun at low elevation angles. Being serial, their main disadvantage is the need of a heavy structure in order to keep rigidity at levels sufficient to sustain solar panel loads. The serial tracker is a large-torque mechanism due to the cantilever beam architecture. The servomotors cannot provide such large torques hence reducers with large reduction ratio are needed. These drive units contain multiple sets of gears that must be designed to handle very large moments and loads. Therefore, the conventional serial tracker is a heavy duty equipment. Also, they are often fitted with heavy counter balances. These result in larger actuator requirements making their power consumption far from optimal.

Minimizing the energy consumption is a very important design requirement for solar trackers. Compared with classical serial mechanisms, parallel mechanisms provide a number of advantages including higher payload to weight ratio, better dynamics and larger stiffness. If parallel mechanisms are utilized to design solar trackers, it is possible to reduce the driving torque, scale down the dimensions of the mounting and reduce the complexity of the system in terms of the number of its components and its assembly. These can reduce the energy consumption. A few solar trackers with parallel mechanisms have been developed. However, the main drawbacks of parallel kinematic solar trackers are small workspace to installation space ratio, as well as the presence of singular configurations within the workspace. Due to the previously mentioned advantages of parallel mechanisms, the parallel kinematic solar trackers have vast potentials for future development if the small workspace problem can be overcome.

By taking both the advantages of traditional solar tracker and parallel mechanism into account, this invention designs a new generation of solar trackers. Compared with other solar trackers, this invention possesses several advantages as simple structure, enough workspace to track the sun, small torque, high stiffness and low energy consumption.

SUMMARY

Embodiments of the present disclosure seek to solve at least one of the problems existing in the related art to at least some extent. For that reason, an objective of the present disclosure is to provide a dual axis solar tracker, which has a good tracking performance and has advantages of high rigidity, large work space, low energy consumption, small torque and low inertia, etc.

The dual axis solar tracker according to embodiments of the present disclosure includes a moving platform, a fixed platform, a serial chain, a parallel chain, and a driving device. The fixed platform is fixed on a foundation. The serial chain is mounted between the moving platform and the fixed platform as a supporting chain, and a bottom of the serial chain is connected to the fixed platform by a revolute joint along a vertical axis, and a top of the serial chain is connected to the moving platform by a revolute joint along a horizontal axis. The parallel chain is mounted between the moving platform and the fixed platform as a driving chain, and both the length and the orientation angle of the parallel chain are variable. The driving device is configured to drive the parallel chain to motion, so as to drive the moving platform to rotate around vertical and horizontal axes.

The dual axis solar tracker according to embodiments of the present disclosure can form a parallel mechanism of two degrees of freedom, and achieve the biaxial rotation and a large work space, thereby having a better tracking performance; and the dual axis solar tracker has advantages of high rigidity, low energy consumption, small torque and low inertia, etc.

In addition, the dual axis solar tracker according to embodiments of the present disclosure may further have the following additional technical features:

According to some embodiments of the present disclosure, the parallel chain includes a five-bar parallel mechanism and a connector. The connector is mounted between the moving platform and the junction of the third rod and the fourth rod.

According to some embodiments of the present disclosure, the five-bar parallel mechanism includes a first rod, a second rod, a third rod, a fourth rod and a fifth rod connected sequentially to form an annular shape by revolute joints along the axes all perpendicular to a plane where the five-bar parallel mechanism is located, and the first rod is connected to the fixed platform by two revolute joints along the same horizontal axis.

Optionally, the five-bar parallel mechanism includes a second rod, a third rod, a fourth rod and a fifth rod. The second rod, the third rod, the fourth rod and the fifth rod are connected sequentially by revolute joints along the axes all perpendicular to the plane where the five-bar parallel mechanism is located, and the second rod and the fifth rod are connected to the fixed platform by two Hooke's joints respectively. Specially, the Hooke's joints' rotating axes connected to the fixed platform are along the same horizontal axis.

According to some embodiments of the present disclosure, the connector includes a first connecting rod and a second connecting rod. The bottom of the first connecting rod is connected to the junction of the third rod and the fourth rod by a revolute joint along an axis perpendicular to the plane where the five-bar parallel mechanism is located, and the top of the first connecting rod is connected to the bottom of the second connecting rod by a revolute joint along an axis parallel to the plane where the five-bar parallel mechanism is located. The top of the second connecting rod is connected to the moving platform by a revolute joint along an axis vertical to the moving platform.

Optionally, the top of the connector is connected to the moving platform by a spherical joint, and the bottom of the connector is fixed to the third rod or the fourth rod.

According to some embodiments of the present disclosure, the driving device includes a first driver and a second driver mounted on the both ends of the first rod respectively, and the first driver and the second driver drive the second rod and the fifth rod to rotate respectively.

Optionally, the driving device includes a first driver and a second driver mounted on the junction of the second rod and the third rod and the junction of the fourth rod and the fifth rod respectively, and the first driver and the second driver drive the second rod and the fifth rod to rotate respectively.

Additional aspects and advantages of embodiments of present disclosure are given in the following descriptions.

BRIEF DESCRIPTION OF THE DRAWINGS

These and other aspects and advantages of embodiments of the present disclosure become apparent and more readily appreciated from the following descriptions and the drawings.

Figure 1:
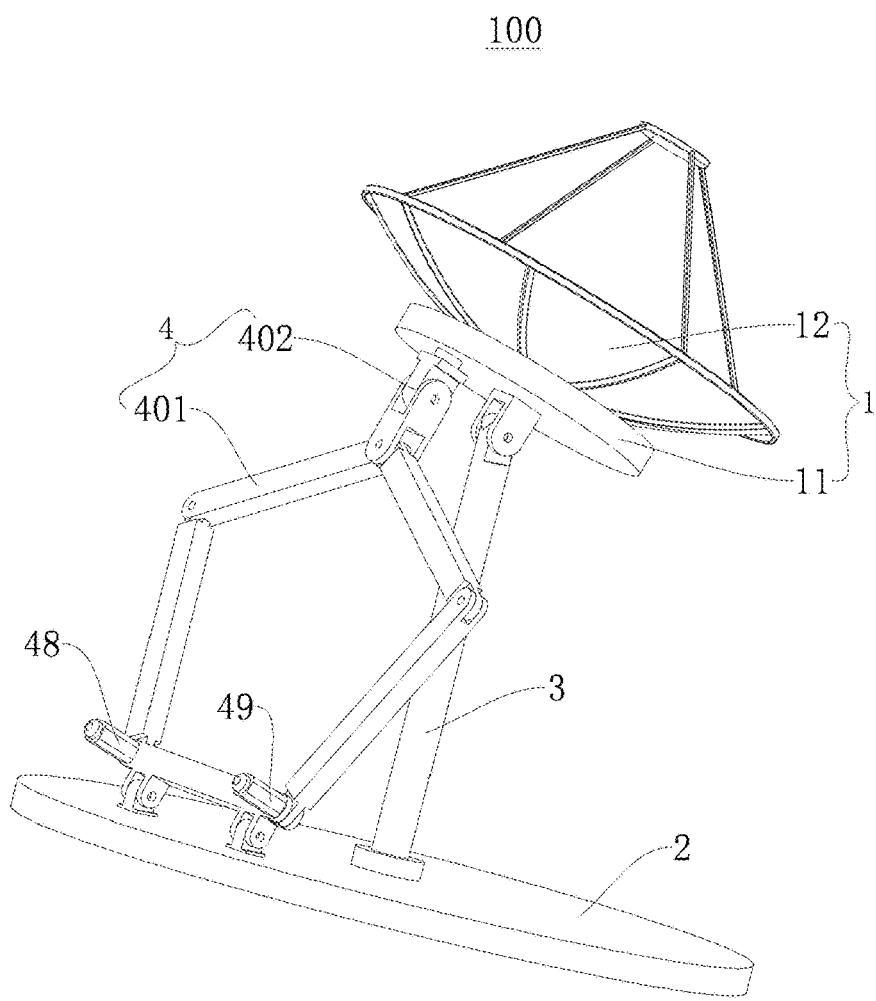
FIG. 1 is a three-dimensional schematic view of a dual axis solar tracker according to embodiments of the present disclosure.

REFERENCE NUMERALS 100 dual axis solar tracker;
1 moving platform; 2 fixed platform; 3 serial chain; 4 parallel chain;
11 moving platform base; 12 solar mirror;
401 five-bar parallel mechanism; 402 connector;
41 first rod; 42 second rod; 43 third rod; 44 fourth rod; 45 fifth rod; 46 first connecting rod;
47 second connecting rod;
48 first driver; 49 second driver

DETAILED DESCRIPTION

Reference is made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

A dual axis solar tracker 100 according to embodiments of the present disclosure is described in detail with reference to FIGS. 1-5. The tracker 100 is used in concentrated solar power systems, but not limited to this.

As shown in FIGS. 1-5, the dual axis solar tracker 100 according to embodiments of the present disclosure includes a moving platform 1, a fixed platform 2, a serial chain 3, a parallel chain 4 and a driving device. The serial chain 3 and the parallel chain 4 are both connected to the moving platform 1 and the fixed platform 2, and they constitute a closed-loop mechanism.

Figure 2:
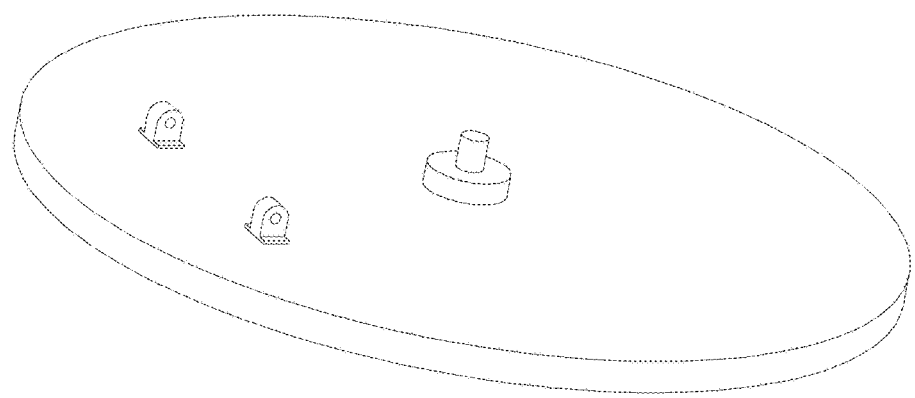
FIG. 2 is a schematic view of a fixed platform of a dual axis solar tracker according to embodiments of the present disclosure.

As shown in FIG. 2, the fixed platform 2 is fixed on a foundation such as ground and roof, providing support for other parts so as to improve stability.

Figure 3:
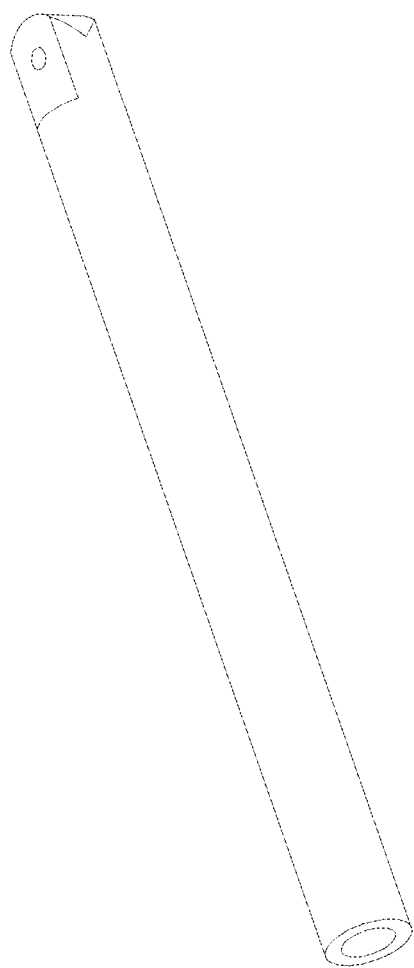
FIG. 3 is a schematic view of a serial chain of a dual axis solar tracker according to embodiments of the present disclosure.

As shown in FIG. 1 and FIG. 3, the serial chain 3 as a supporting pole is mounted between the moving platform 1 and the fixed platform 2. A bottom of the serial chain 3 is connected to the fixed platform 2 by a revolute joint along a vertical axis, and a top of the serial chain 3 is connected to the moving platform 1 by a revolute joint along a horizontal axis, such that the moving platform 1 can rotate both around vertical and horizontal axes.

Figure 4:
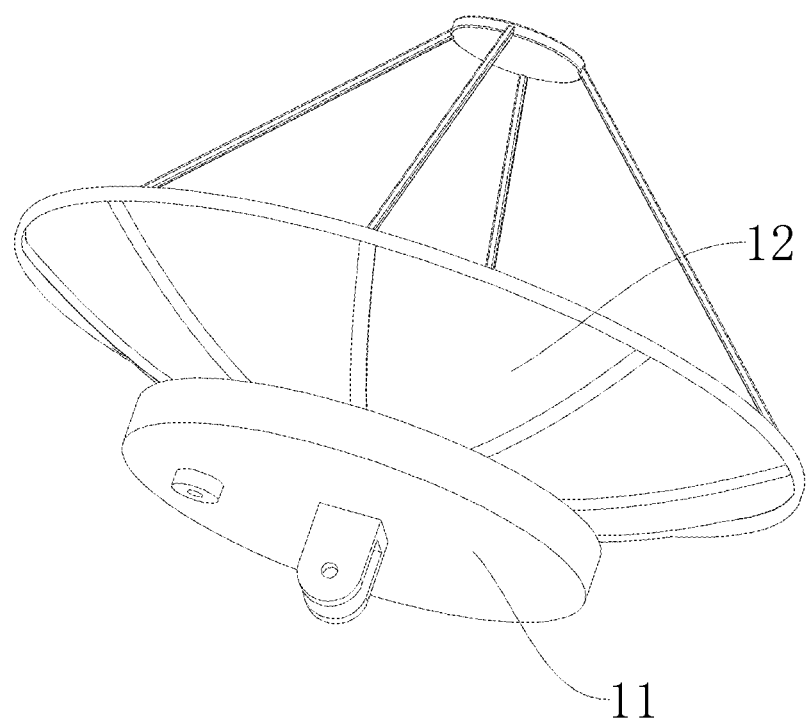
FIG. 4 is a schematic view of a moving platform of a dual axis solar tracker according to embodiments of the present disclosure.

As shown in FIG. 1 and FIG. 4, the moving platform 1 supported by the serial chain 3 and driven by the parallel chain 4 includes a moving platform base 11 and a solar mirror 12. The solar mirror 12 is fixed on the moving platform base 11. Thus the solar mirror 12 can follow the movement of the moving platform 1. The solar mirror 12 can concentrate sunlight onto a small area so as to implement the subsequent utilization of solar energy for power generation.

Figure 5:
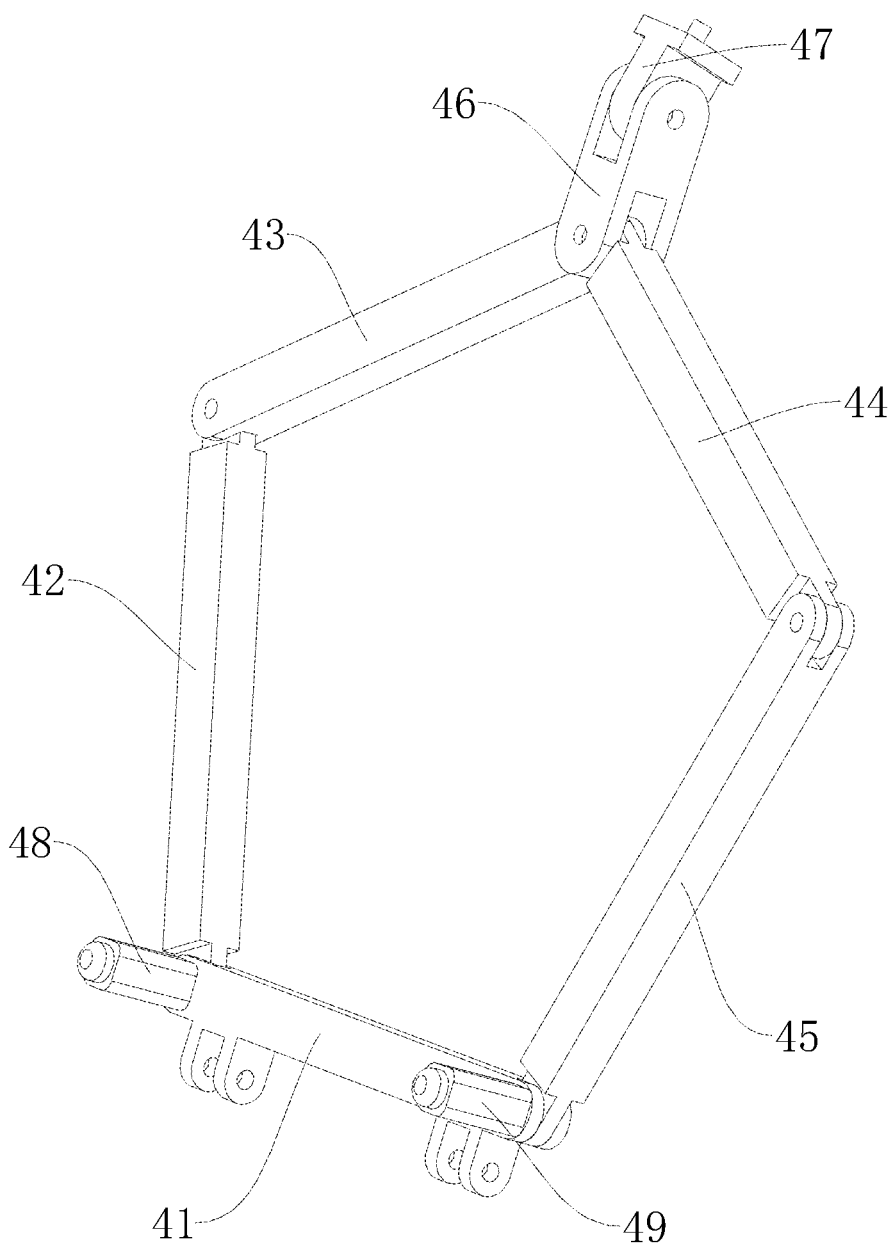
FIG. 5 is a schematic view of a parallel chain of a dual axis solar tracker according to embodiments of the present disclosure.

As shown in FIG. 1 and FIG. 5, the parallel chain 4 mounted between the moving platform 1 and the fixed platform 2 includes a five-bar parallel mechanism 401 and a connector 402. The five-bar parallel mechanism 401 comprises a first rod 41, a second rod 42, a third rod 43, a fourth rod 44 and a fifth rod 45. The five rods are connected sequentially to form an annular shape by revolute joints along the axes all perpendicular to a plane where the five-bar parallel mechanism 401 is located. The first rod 41 is connected to the fixed platform 2 by two revolute joints along the same horizontal axis. The connector 402 includes a first connecting rod 46 and a second connecting rod 47. A bottom of the first connecting rod 46 is connected to the junction of the third rod 43 and the fourth rod 44 by a revolute joint along an axis perpendicular to the plane where the five-bar parallel mechanism 401 is located. A top of the first connecting rod 46 is connected to a bottom of the second connecting rod 47 by a revolute joint along an axis parallel to the plane where the five-bar parallel mechanism 401 is located. A top of the second connecting rod 47 is connected to the moving platform 1 by a revolute joint along an axis perpendicular to the moving platform.

The driving device includes two drivers. Specifically, the driving device includes a first driver 48 and a second driver 49. The two drivers are mounted on the both ends of the first rod 41 respectively. The first driver 48 and the second driver 49 drive the second rod 42 and the fifth rod 45 to rotate respectively. Then, the parallel chain 4 can rotate around the axes perpendicular to the plane where the five-bar parallel mechanism 401 is located and change the length itself. Likewise, the orientation angle of the parallel chain 4 can also change. With the motion of the parallel chain 4, the elevation angle and the azimuth angle of the moving platform 1 change to follow the Sun, thus realizing the perpendicularly incidenting of the sunlight on the surface of the solar mirror 12.

According to some embodiments of the present disclosure, persons skilled in the art may make proper replacements or modifications of components of the tracker 100. Some embodiments are given as follows.

1. The first rod 41 could be removed, and the second rod 42 and fifth rod 45 could be connected to the fixed platform 2 by two Hooke's joints respectively. Specially, the Hooke's joints' rotating axes connected to the fixed platform are along the same horizontal axis.

2. The connector 402 could combine into one part. Meanwhile, the top of the connector 402 is connected to the moving platform 1 by a spherical joint, and the bottom is fixed to the third rod 43 or the fourth rod 44.

3. The second connecting rod 47 could be simplified into a Hooke's joint and connected to the moving platform 1.

4. The two drivers could be mounted on the junction of the second rod 42 and the third rod 43 and the junction of the fourth rod 44 and the fifth rod 45 respectively. The first driver 48 and the second driver 49 drive the second rod 42 and the fifth rod 45 to rotate respectively.

The replacements and modifications of the above connecting parts are known to those skilled in the art, which would not be described in detail herein.

In conclusion, the dual axis solar tracker 100 according to the embodiments of the present disclosure has two rotational degrees of freedom and the moving platform 1 is supported by the serial chain 3 and driven by the parallel chain 4, forming a parallel tracking mechanism. Therefore, it has larger workspace, higher rigidity, smaller torque and inertia, lower energy consumption, better tracking performance, and higher solar energy utilization ratio.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A dual axis solar tracker comprising:
a moving platform;
a fixed platform fixed on a foundation;
a serial chain mounted between the moving platform and the fixed platform and having a bottom connected to the fixed platform by a revolute joint along a vertical axis and a top connected to the moving platform by a revolute joint along a horizontal axis;
a parallel chain mounted between the moving platform and the fixed platform, both the length and the orientation angle of the parallel chain being variable; and
a driving device configured to drive the parallel chain to move so as to drive the moving platform to rotate around vertical and horizontal axes;
wherein the parallel chain comprises a five-bar parallel mechanism and a connector, the connector being mounted between the moving platform and the junction of the third rod and the fourth rod.

2. The dual axis solar tracker according to claim 1, wherein the five-bar parallel mechanism comprises a first rod, a second rod, a third rod, a fourth rod and a fifth rod connected sequentially to form an annular shape by revolute joints along the axes all perpendicular to a plane where the five-bar parallel mechanism is located, the first rod being connected to the fixed platform by two revolute joints along the same horizontal axis.

3. The dual axis solar tracker according to claim 1, wherein the five-bar parallel mechanism comprises a second rod, a third rod, a fourth rod, and a fifth rod, the second rod, the third rod, the fourth rod and the fifth rod being connected sequentially by revolute joints along the axes perpendicular to a plane where the five-bar parallel mechanism is located, the second rod and the fifth rod being respectively connected to the fixed platform by two Hooke's joints whose rotating axes connected to the fixed platform are along the same horizontal axis.

4. The dual axis solar tracker according to claim 1, wherein the connector comprises a first connecting rod and a second connecting rod, a bottom of the first connecting rod being connected to the junction of the third rod and the fourth rod by a revolute joint along an axis perpendicular to a plane where the five-bar parallel mechanism is located, a top of the first connecting rod being connected to the bottom of the second connecting rod by a revolute joint along an axis parallel to the plane where the five-bar parallel mechanism is located, and a top of the second connecting rod being connected to the moving platform by a revolute joint along an axis vertical to the moving platform.

5. The dual axis solar tracker according to claim 1, wherein the top of the connector is connected to the moving platform by a spherical joint, and the bottom of the connector is fixed to the third rod or the fourth rod.

6. The dual axis solar tracker according to claim 2, wherein the driving device comprises a first driver and a second driver mounted on the both ends of the first rod respectively, the first driver and the second driver driving the second rod and the fifth rod to rotate respectively.

7. The dual axis solar tracker according to claim 2, wherein the driving device comprises a first driver and a second driver mounted on the junction of the second rod and the third rod and the junction of the fourth rod and the fifth rod respectively, the first driver and the second driver driving the second rod and the fifth rod to rotate respectively.

8. The dual axis solar tracker according to claim 3, wherein the driving device comprises a first driver and a second driver mounted on the junction of the second rod and the third rod and the junction of the fourth rod and the fifth rod respectively, the first driver and the second driver driving the second rod and the fifth rod to rotate respectively.

* * * * *